(12) United States Patent
Khairallah et al.

(10) Patent No.: US 11,373,081 B2
(45) Date of Patent: Jun. 28, 2022

(54) PROCESS FOR MANUFACTURING A NON-OPAQUE LAYER FOR A MULTILAYER STRUCTURE COMPRISING A WINDOW, AND A MULTILAYER WITH SUCH A NON-OPAQUE LAYER

(71) Applicants: LINXENS HOLDING, Mantes la Jolie (FR); HID GLOBAL CID SAS, Levallois Perret (FR)

(72) Inventors: Jessy Khairallah, Bangkok (TH); Kreangsak Saeingthong, Samut Prakan (TH); Alice Vermeulin, Paris (FR); Anthony Rouch-Paulin, Gigean (FR)

(*) Notice: Subject to any disclaimer, the term of this patent is extended or adjusted under 35 U.S.C. 154(b) by 6 days.

(21) Appl. No.: 15/775,866

(22) PCT Filed: Nov. 13, 2015

(86) PCT No.: PCT/IB2015/002668
§ 371 (c)(1),
(2) Date: May 14, 2018

(87) PCT Pub. No.: WO2017/081508
PCT Pub. Date: May 18, 2017

(65) Prior Publication Data
US 2018/0322378 A1    Nov. 8, 2018

(51) Int. Cl.
*G06K 19/077* (2006.01)
*B32B 3/08* (2006.01)
(Continued)

(52) U.S. Cl.
CPC ........ *G06K 19/07773* (2013.01); *B32B 3/085* (2013.01); *B32B 3/263* (2013.01);
(Continued)

(58) Field of Classification Search
CPC ....... G06K 19/07773; G06K 19/07722; G06K 19/0772; G06K 19/077; B32B 2307/412;
(Continued)

(56) References Cited

U.S. PATENT DOCUMENTS 3,987,449 A * 10/1976 DeAngelis ........ B32B 17/10036
343/713
4,550,248 A * 10/1985 Hoppe ............. G06K 19/07743
235/441
(Continued)

FOREIGN PATENT DOCUMENTS

EP    2116366    11/2009
EP    2196950    6/2010
(Continued)

*Primary Examiner* — Daniel I Walsh
(74) *Attorney, Agent, or Firm* — Occhiuti & Rohlicek LLP

(57) ABSTRACT

A process includes providing a first layer, which is made of a non-opaque plastic material having an initial thickness, covering an area of the first layer with a patterned plate, pressing the patterned plate against a first surface of the first layer so as to form first and second regions thereon, with the second region being thicker than the first region, and removing the patterned plate from the first surface. The patterned plate comprises a cavity having a size of that corresponds to a window.

29 Claims, 3 Drawing Sheets

(51) Int. Cl.
  *B32B 3/26* (2006.01)
  *B32B 27/08* (2006.01)
  *B32B 27/36* (2006.01)
  *B32B 27/32* (2006.01)
  *B32B 27/30* (2006.01)
  *B42D 25/373* (2014.01)
  *B42D 25/305* (2014.01)
  *B42D 25/355* (2014.01)

(52) U.S. Cl.
  CPC .............. *B32B 3/266* (2013.01); *B32B 27/08* (2013.01); *B32B 27/304* (2013.01); *B32B 27/32* (2013.01); *B32B 27/36* (2013.01); *B32B 27/365* (2013.01); *B42D 25/305* (2014.10); *B42D 25/355* (2014.10); *B42D 25/373* (2014.10); *G06K 19/07722* (2013.01); *B32B 2307/412* (2013.01); *B32B 2425/00* (2013.01); *B32B 2554/00* (2013.01)

(58) Field of Classification Search
  CPC ....... B32B 2425/00; B32B 3/02; B32B 3/085; B32B 3/263; B32B 3/266; B32B 3/28; B32B 3/30
  See application file for complete search history.

(56) References Cited

U.S. PATENT DOCUMENTS

| | | | | |
|---|---|---|---|---|
| 5,725,819 | A * | 3/1998 | Onishi | B29C 45/5675 264/161 |
| 8,485,447 | B1 * | 7/2013 | Pyhrr | G06K 1/125 235/492 |
| 8,608,080 | B2 * | 12/2013 | Finn | H01L 24/85 235/492 |
| 9,390,363 | B1 * | 7/2016 | Herslow | B32B 27/08 |
| 10,089,570 | B2 * | 10/2018 | Herslow | H01Q 1/38 |
| 10,452,967 | B2 * | 10/2019 | Herslow | B29C 59/026 |
| 10,513,141 | B2 | 12/2019 | Zinke | B42D 25/351 |
| 2001/0005603 | A1 * | 6/2001 | Kubota | B32B 37/10 438/126 |
| 2002/0007906 | A1 * | 1/2002 | Droz | G06K 19/077 156/269 |
| 2003/0008118 | A1 * | 1/2003 | Smulson | B32B 27/08 428/209 |
| 2004/0043203 | A1 * | 3/2004 | Bogdanovic | B42D 25/00 428/201 |
| 2004/0159709 | A1 * | 8/2004 | Ohta | G06K 19/077 235/492 |
| 2004/0238210 | A1 * | 12/2004 | Droz | G06K 19/07749 174/258 |
| 2005/0230959 | A1 * | 10/2005 | Nemeth | B42D 25/00 283/74 |
| 2006/0237543 | A1 * | 10/2006 | Goto | G06K 19/0702 235/492 |
| 2007/0181695 | A1 * | 8/2007 | Keshura | B32B 38/00 235/488 |
| 2007/0246931 | A1 * | 10/2007 | Hansen | G06K 19/025 283/83 |
| 2009/0321527 | A1 * | 12/2009 | Kato | G06K 19/07749 235/486 |
| 2010/0020151 | A1 * | 1/2010 | Jones | B41J 3/60 347/104 |
| 2010/0047488 | A1 | 2/2010 | Syrjanen et al. | |
| 2011/0020606 | A1 * | 1/2011 | Herslow | B32B 27/30 428/162 |
| 2011/0024036 | A1 * | 2/2011 | Benato | G06K 19/0775 156/277 |
| 2011/0189620 | A1 * | 8/2011 | Herslow | C21D 1/26 432/9 |
| 2011/0215563 | A1 * | 9/2011 | Rancien | G06K 19/07749 283/113 |
| 2011/0311768 | A1 * | 12/2011 | Droz | B32B 7/12 428/138 |
| 2014/0197626 | A1 * | 7/2014 | Loarer | B42D 25/29 283/85 |
| 2014/0272131 | A1 * | 9/2014 | Combs | C09J 5/06 427/208.2 |
| 2015/0290958 | A1 * | 10/2015 | Genet | D21H 21/44 428/32.5 |
| 2017/0017871 | A1 * | 1/2017 | Finn | G06K 19/07722 |
| 2018/0211147 | A1 * | 7/2018 | Cox | B32B 27/08 |
| 2018/0322378 | A1 * | 11/2018 | Khairallah | B42D 25/305 |
| 2018/0339503 | A1 * | 11/2018 | Finn | H01Q 1/2225 |
| 2020/0202080 | A1 * | 6/2020 | Senge | B32B 37/02 |
| 2020/0250504 | A1 * | 8/2020 | Lotya | G06K 19/02 |
| 2021/0117744 | A1 * | 4/2021 | Finn | G06K 19/0726 |

FOREIGN PATENT DOCUMENTS

| | | |
|---|---|---|
| EP | 2275279 | 1/2011 |
| EP | 1516086 | 4/2012 |
| EP | 2511094 | 10/2012 |
| WO | WO2010/070084 | 6/2010 |
| WO | WO2012/097463 | 7/2012 |
| WO | WO2004/076198 | 9/2014 |
| WO | WO2014/203199 | 12/2014 |
| WO | WO 2014/203199 | 12/2014 |

* cited by examiner

PROCESS FOR MANUFACTURING A NON-OPAQUE LAYER FOR A MULTILAYER STRUCTURE COMPRISING A WINDOW, AND A MULTILAYER WITH SUCH A NON-OPAQUE LAYER

RELATED APPLICATIONS

Under 35 USC 371, this is the national stage of international application PCT/IB2015/002668, filed on Nov. 13, 2015.

FIELD OF INVENTION

The invention relates to fraud prevention, and in particular, to hindering counterfeiting and forgery.

BACKGROUND

Known methods of manufacturing multilayer structures for use in anti-counterfeiting and anti-forgery applications require precise alignment of the various layers. This adds complexity to the manufacturing process. The complex additional process steps increase manufacturing time and costs.

It is also known to manufacture a multilayer structure that has a window laminated with a transparent layer made of thermoplastic material. Both layers have a window. The transparent layer will be part of the final multilayer-structure as it will be used. But, such a multilayer structure obtained with such a process may have faults and deformations.

SUMMARY

The invention relates to improvements in the domain of processes for manufacturing multilayer structures comprising a non-opaque window. Such a non-opaque window, which may be transparent, is used for instance in security documents or cards having laminate structures, for increasing the difficulty to counterfeit and forge them.

In one aspect, the invention includes manufacturing a non-opaque layer to be included in a multilayer structure comprising at least one non-opaque window. The non-opaque layer is made with a region having an extra-thickness that is more easily inserted and aligned with the window or cut-out made in an adjacent layer.

The region with the extra-thickness may sufficiently fill this window or cut-out for avoiding the use of patches in the window. Furthermore, a patterned plate that is heated for making the non-opaque material flowing in its cavity is removed and is not part of the final structure. The material of the patterned plate can be specifically chosen for its function, i.e. forming a cavity within which the non-opaque material can flow for shaping the region with the extra-thickness.

BRIEF DESCRIPTION OF THE DRAWINGS

Other features and advantages of the invention will be apparent from the following description and from an inspection of the accompanying drawings in which.

On the drawings, same reference numerals denote the same elements.

The invention is hereafter explained with reference to identity card applications. However, it is to be understood that the invention can be implemented for other applications such as smartcards, passports, badges, etc., and in particular, whenever a see-through portion or window is required.

DETAILED DESCRIPTION

Figure 1:
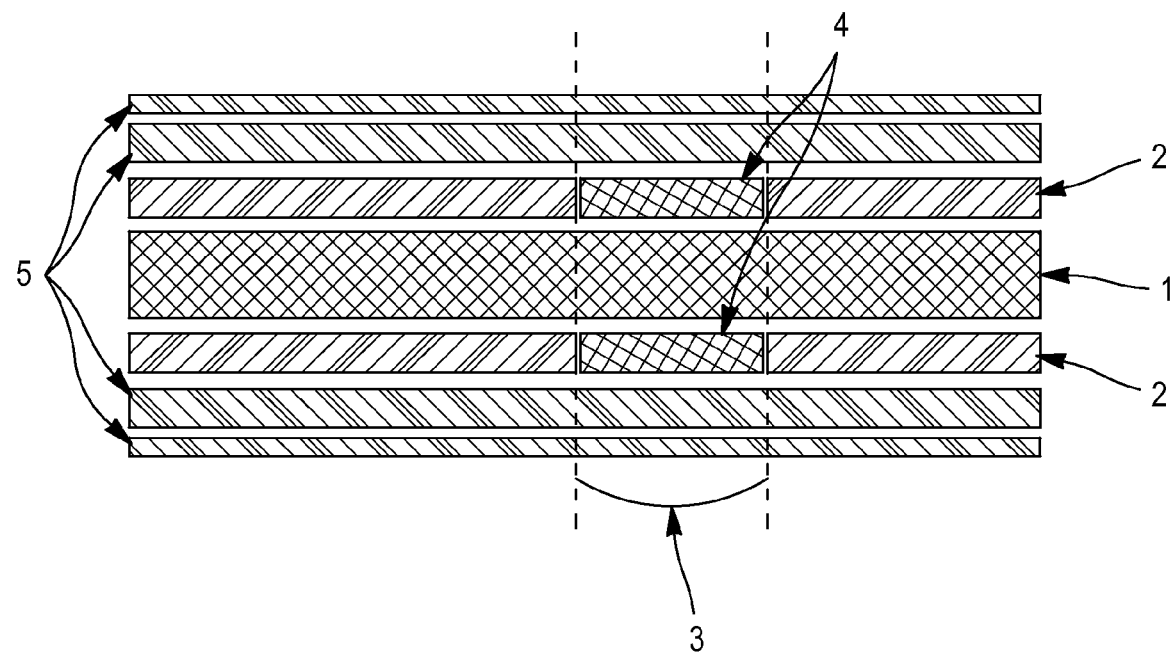
FIG. 1 shows a stack of layers.

FIG. 1 shows a multilayer structure having a transparent substrate 1 including a thermoplastic material, compensation layers 2 with a window 3, and transparent patches 4 positioned in the windows 3 over the transparent substrate 1. Other layers 5 may be stacked up on one or both sides of such a structure before lamination.

Figure 2:
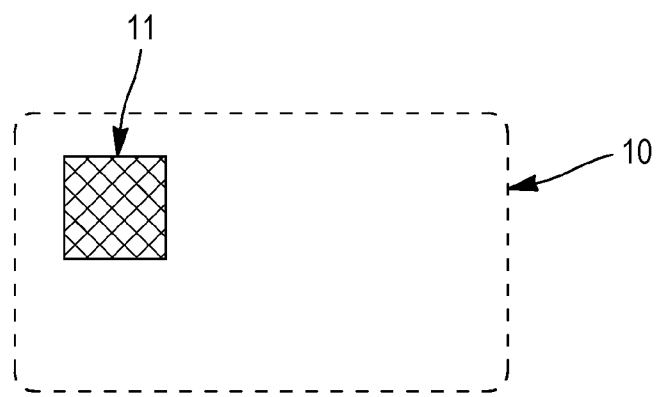
FIG. 2 shows a front view of a card with a clear window.

FIG. 2 shows a card 10 with a see-through window 11. The window 11 can be a clear or transparent window. More generally, the window 11 is a non-opaque window.

An example of a process according to the invention is described with reference to FIGS. 3 to 5. This example results in an insert or inlay.

Figure 3:
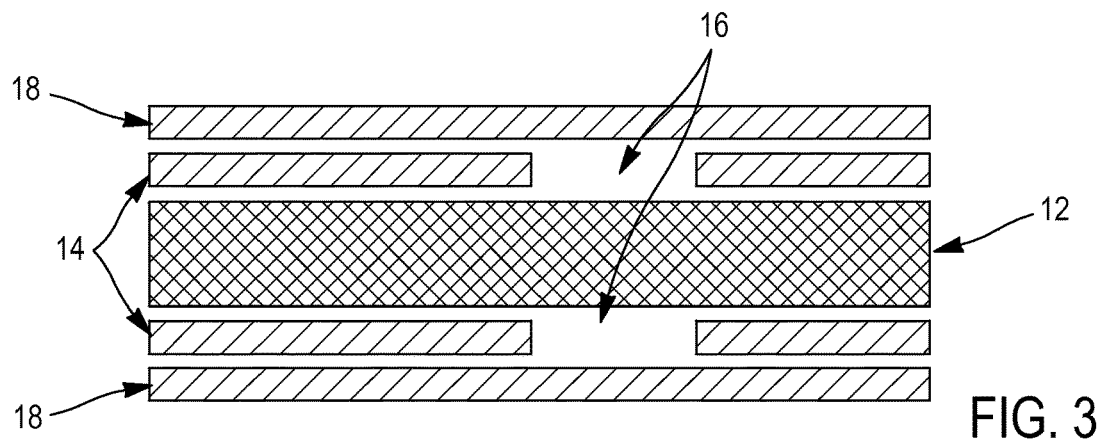
FIG. 3 is a cross-section of a non-opaque layer inserted between patterned and covering sheets before lamination.

As illustrated on FIG. 3, for obtaining a card 10, the manufacturing process comprises embossing a middle layer or inlay. The process begins with a non-opaque layer 12. Such a non-opaque layer 12 is made of non-opaque plastic material including but not limited to one of the following compounds: polycarbonate (PC), poly(vinyl-chloride) (PVC), polyethylene terephthalate (PET), polyethylene terephthalate glycol modified (PETg), polyethylene terephthalate film (PETf), polylactic acid (PLA), polyethylene (PE) or polyestercarbonate (PEC). The non-opaque layer 12 can be a stack up of different layers. In some embodiments, the initial thickness of the non-opaque layer 12, before embossing and lamination is in the range of 100 μm up to 650 μm.

The non-opaque layer 12 is then placed between patterned plates, sheets, or layers 14. The material of these patterned plates, or the material covering them, is chosen to avoid having them stick to the non-opaque layer 12 after it has been embossed. The patterned plates 14 have one or more openings. In some practices, punching through the patterned plate 14 creates these openings.

The method includes placing covering sheets 18 or plates to cover each patterned plate 14 and its openings. This forms cavities 16. Each cavity 16 opens toward a surface of the non-opaque layer 12. Many materials can be used for forming the patterned plates 14 and the covering sheets 18. Among these are paper, metal, and liner plastic film.

Figure 4:
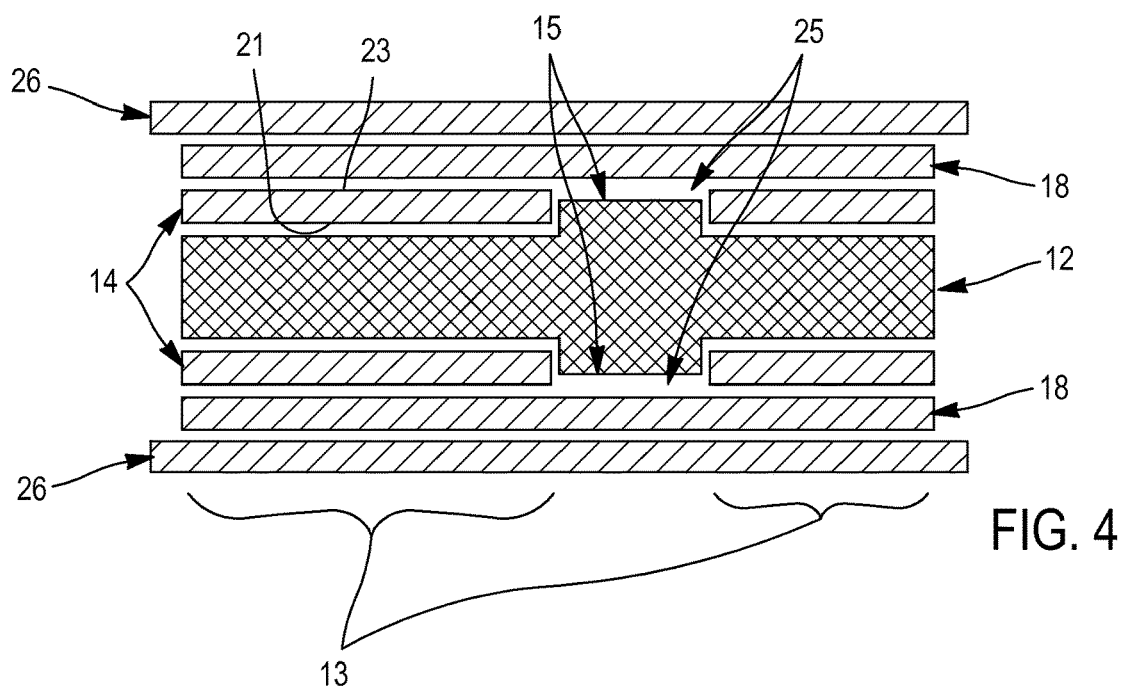
FIG. 4 is a cross-section of the non-opaque layer of FIG. 3, with a region having an extra-thickness resulting from the lamination.
Figure 5:
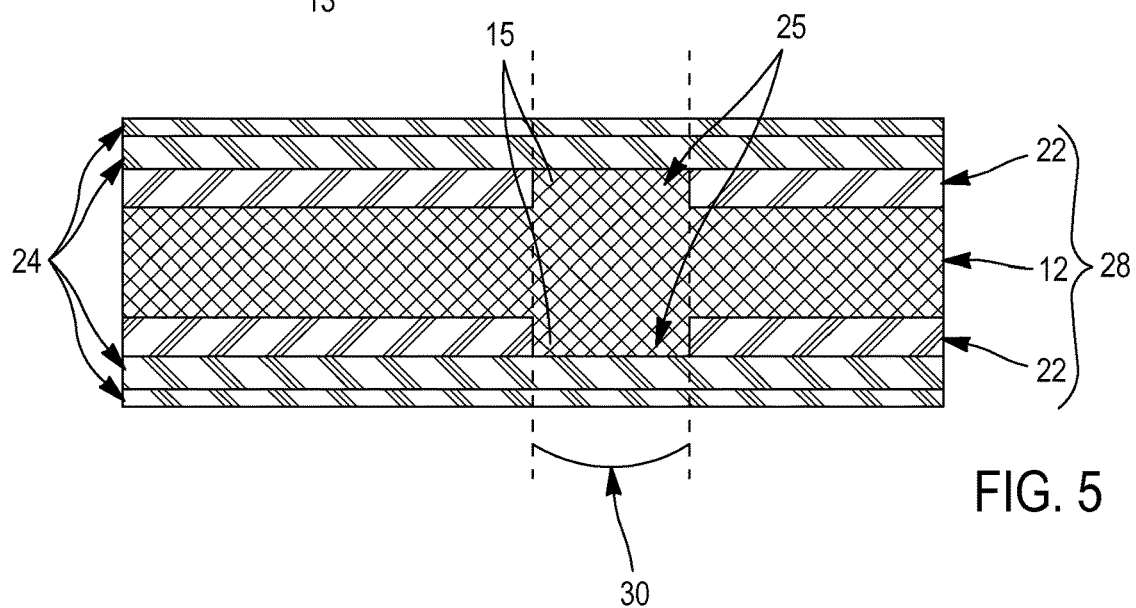
FIG. 5 is a cross section of a non-opaque layer with a region having an extra thickness, laminated with compensation and finishing layers, in a finished card.

As shown in FIG. 4, a stack formed by the non-opaque layer 12, the patterned plates 14, and the covering sheets 18 is then laminated between lamination plates 26. This results in the embossing of the non-opaque layer 12.

This first lamination process comprises a hot-pressing cycle followed by a cool cycle. For example, when the non-opaque material is polycarbonate, during the hot pressing cycle, the non-opaque material is pressed with a temperature in a range from 160° C. to 195° C. and a pressure in a range from 17 to 110 N/cm2, for a duration of between 15 and 45 minutes. More generally, for materials other than polycarbonate, during the hot-pressing cycle, the non-opaque material may be pressed at a temperature that is within a range from 120° C. to 195° C. and a pressure that is within a range from 17 to 110 newtons per square centimeter, for a duration between 15 and 45 minutes.

After the hot-pressing cycle, the non-opaque material will have flowed into the cavities 16. For example, when the non-opaque material is polycarbonate, during a cool-pressing cycle, the stack formed by the non-opaque 12, the patterned plates 14, and the covering sheet 18 is pressed at a temperature that is within the range from 15° C. to 25° C. and at a pressure that is within a range from 50 to 220 newtons per square centimeter for a duration between 13 and 45 minutes. The cool cycle allows the non-opaque layer 12 to be frozen and limits its shrinking.

In an alternative practice, the openings 16 are not punched through the entire thickness of the patterned plates 14. Such a practice includes etching the cavities or hollows 16 or milling them over a part of the patterned plate's thickness. In such practices, the covering sheets 18 and/or the lamination plates 26 become optional. In other words, they are all part of the patterned plates 14. The patterned plates 14 are then positioned over the non-opaque layer 12 so that each cavity opens toward the main surface of the non-opaque layer 12.

After the hot-pressing cycle, the non-opaque material will have flowed into the cavities 16. The final thickness of the non-opaque layer 12 in a first region 13, in which the non-opaque layer 12 is thinner, is close to the initial thickness of non-opaque layer 12 before lamination, for example, within a range of 0 to 20 μm. The final thickness of the non-opaque layer 12 in a second region 15, in which the non-opaque layer 12 is thickest, is 10% to 80% thicker than its thickness in the first region 13. The thickness of the non-opaque layer 12 in the second region 15 thus exceeds that of the non-opaque layer 12 in the first region 13 by an extra-thickness that substantially corresponds to the depth of the cavities 16.

After this first lamination process, the patterned plates 14 and covering sheets 18 are separated and removed from the non-opaque layer 12. Both surfaces of the non-opaque layer 12 are then free. In some embodiments, the material of the patterned plates 14 and covering sheets 18 is such that these surfaces of the non-opaque layer 12 have a controlled roughness for improving the cohesion with further layers.

The non-opaque layer 12 with its extra-thickness regions 15 is subsequently prepared for a second lamination process for making the final card structure shown on FIG. 5.

Compensation layers 22 and finishing layers 24 are laid over the non-opaque layer 12. In particular, the compensation layers 22 are laid over the non-opaque layer 12 and then the finishing layers 24 are laid over each compensation layer 22.

The function of a compensation layer 22 is to compensate for the extra-thickness of the non-opaque layer 12. This forms a substantially flat surface over which the finishing layer 24 can lay.

In some embodiments, the compensation layers 22 and the finishing layers 24 are made of plastic materials that are compatible with the material used for non-opaque layer 12. For example, if the non-opaque layer 12 is made of polycarbonate material, the compensation layers 22 and finishing layers 24 are also polycarbonate materials with the thickness being chosen to reach the final targeted card thickness.

In some embodiments, the non-opaque layer 12 is transparent and 340 μm thick in the first region 13, the compensation layers 22 are white and 100 μm thick, and the finishing layers 24 are transparent and each made of two layers, respectively 50 and 100 μm thick, as show on FIG. 7 which will be described below with more details.

Each compensation layer 22 has a window 25 that coincides with the second region 15. It is easy to align the second regions 15 of the non-opaque layer 12 and the windows 25. This simplifies and the manufacturing process and makes it more efficient. In fact, the extra-thickness of the second regions 15 of the non-opaque layer 12 are themselves useful for abutting the edges of the windows 25, thus providing an easy way to carry out the alignment. The second region 15 thus fills in the window 25.

Even, if due to tolerances, there remains a small gap between the edges of second region 25 and those of the windows 25, such a gap would not have any significance consequence. This is because, during a second lamination process, such a gap would be filled as either non-opaque material and/or the material from which the compensation layers 22 are made will flow or creep into this gap.

After the second lamination process, this stack of layers 12, 22, 24 forms a multilayer structure 28, or laminate. The non-opaque layer 12 and the compensation layer 22 can form a multilayer structure 28 that is useful for many applications.

The process described herein makes it possible to make several cards 10 at once and make cut outs in the multilayer structure 28 to make final cards. This manufacturing process allows making several multilayered structures with precise alignment within a repeatable, efficient and cost-effective process.

According this invention the alignment of non-opaque plastic material within the window is accurate and the application of a security feature bigger than the window will not be deformed. In contrast, in the case of the patch in the prior art, the non accurate alignment will induce a deformation of the security feature at the boundary of the window.

Figure 6:
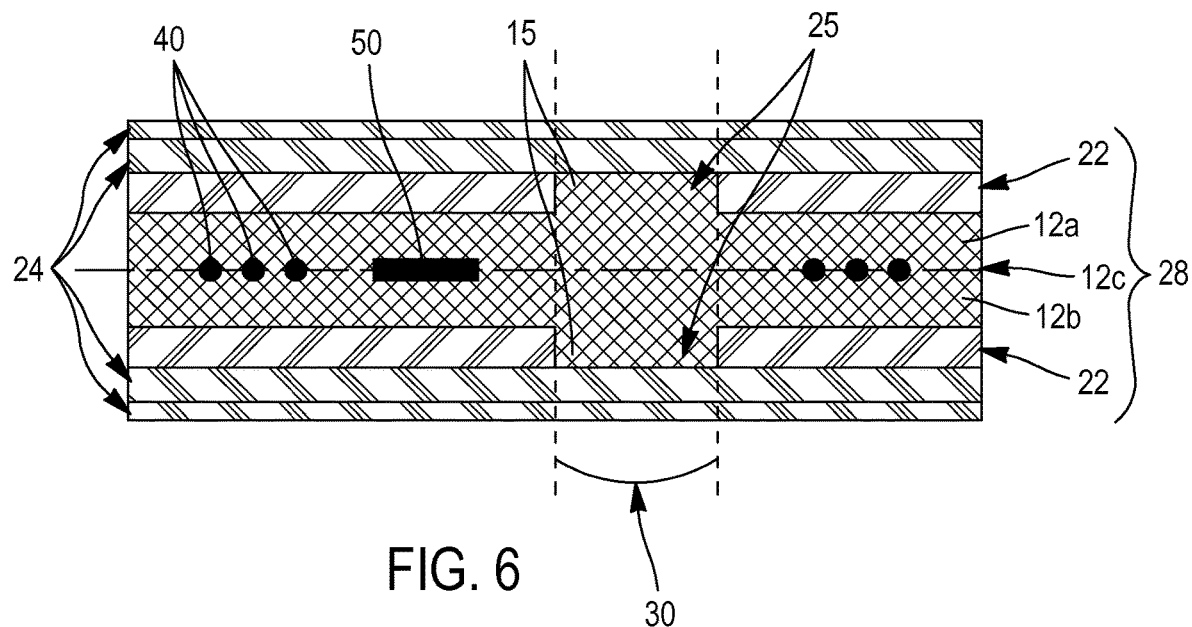
FIG. 6 is cross section, similar to that shown in FIG. 5, of another embodiment of a multilayer structure.

According to another embodiment shown on FIG. 6, the non-opaque layer 12 is made of two non-opaque strata 12a, 12b of the same non-opaque material. Originally, these non-opaque strata 12a, 12b are separate. Then, before the step above-described in connection with FIG. 3, it is possible to insert an antenna 40 and a chip 50 between the strata 12a, 12b. In the illustrated embodiment, the antenna is a loop antenna having three loops, which can be seen in cross-section as dots in FIG. 6.

The next steps of the process are similar to the ones above-described. The dotted line 12c between strata 12a, 12b is only shown to identify the layers 12a, 12b. In fact, after lamination, there is no boundary. The result is a single layer of non-opaque material with its a second region 15 having an extra thickness.

Figure 7:
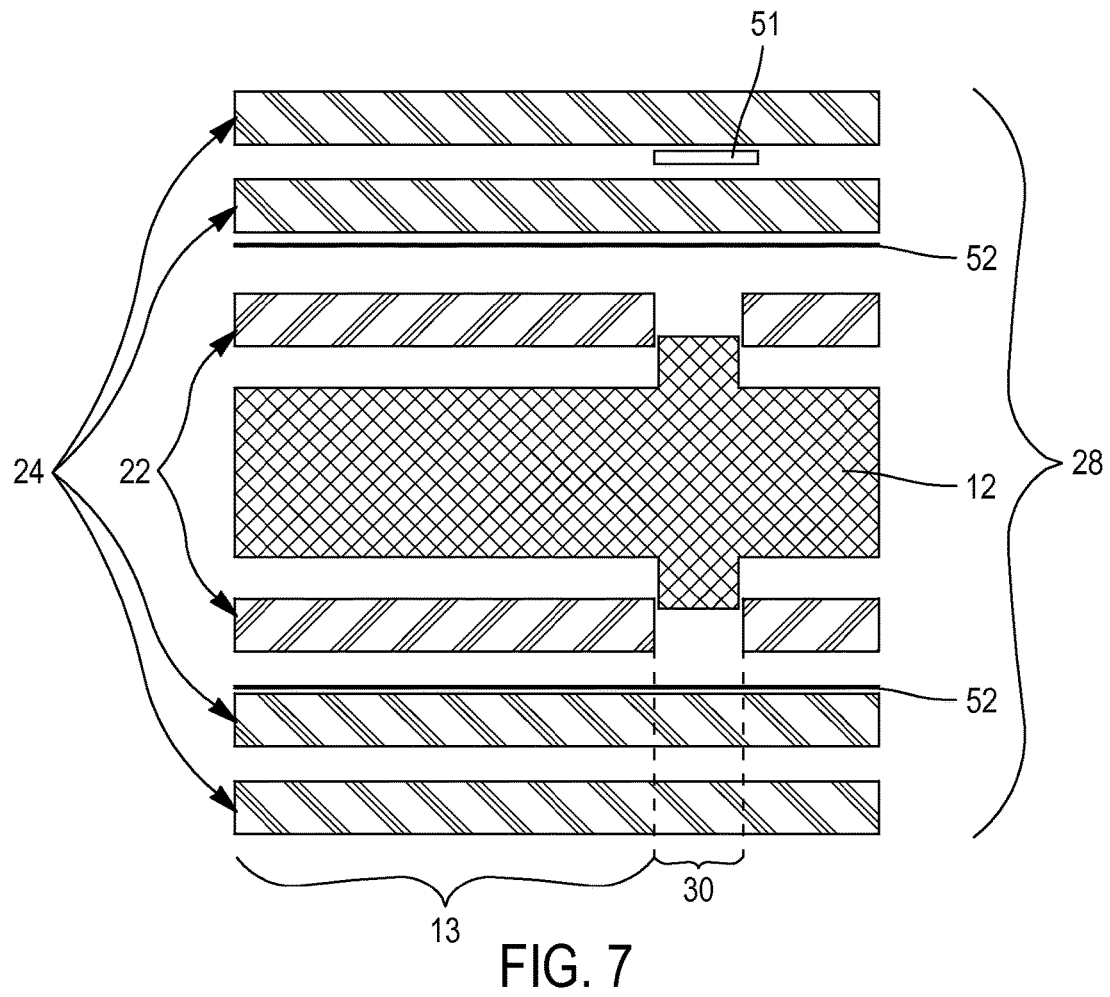
FIG. 7 is cross section, similar to that shown in FIG. 5 or 6, of another embodiment of a multilayer structure.

FIG. 7 illustrates another practice of the method.

As shown in FIG. 7, the non-opaque layer 12 is inserted between compensation layers 22 and finishing layers 24. For this illustrated example, a security element 51 is inserted between two finishing layers 24 covering the same side of the multilayer structure 28. This security element 51 can have a shape with dimensions larger or smaller than the corresponding ones of the window 30. A security background 52 can also be applied on a layer or inserted between two layers of the multilayer structure 28.

For this illustrated example, security backgrounds 52 are applied on a finishing layer 24 facing a compensation layer 22, on each side of the multilayer structure 28. For example, in the illustrated multilayer structure 28, the non-opaque layer 12 is transparent and 340 µm thick in the first region 13, the compensation layers 22 are white and 100 µm thick and the finishing layers 24 are transparent and each made of two layers, respectively 50 and 100 µm thick, the thinner of the two layers being the internal layer.

Many variations of the above-described processes can be envisioned. In some embodiments, the see-through windows 30 corresponding to the second regions 15 on each side of the multilayer structure 28 have different shapes and/or sizes. In other embodiments, the non-opaque layer 12 is mass-colored.

The non-opaque layer 12 and/or the multilayer structure 28 can be used for many applications.

In some embodiments, the non-opaque layer 12 does not contain any smart component. These embodiments store data in magnetic strips inserted between finishing layers, such as in the security background 52, shown on FIG. 7.

In other embodiments, the non-opaque layer 12 is inserted in a multilayer structure 28 that will then be milled in an area that differs from that which includes the window 30 for attaching a chip module with terminals for contact communication with a card reader.

Yet other embodiments feature an antenna and a chip inserted in the non-opaque layer 12 as already described in connection with FIG. 6, for making a contactless card.

In yet other embodiments, an antenna 40 is inserted between two strata 12a, 12b that comprise the non-opaque layer 12 prior to laminating it in a multilayer structure and milling a cavity within which a chip module with terminals will be attached and connected to the antenna for making a dual interface card.

In yet other embodiments, an antenna 40 and a chip 50 are inserted in the non-opaque layer 12 as already described in connection with FIG. 6, and a cavity is milled in the multilayer structure 28 for accommodating a chip module with terminals and achieving a hybrid card.

Having described the invention and a preferred embodiment thereof, what is new and secured by Letters Patent is:

1. A method comprising manufacturing a first layer for use in a card having a cut-out in a layer thereof, wherein manufacturing said first layer comprises covering an area of said first layer with a patterned plate, thereby forming a cavity that is disposed to be aligned with said cut-out in said layer of said card, embossing said first layer, wherein embossing said first layer comprises placing said patterned plate directly in contact with a first surface of said first layer and pressing said patterned plate against a first surface of said first layer so as to form a first region and a second region in said first layer, and, after having embossed said first layer, removing said patterned plate from said first surface, wherein said first layer is made of a non-opaque plastic material that is flowable under hot pressing during embossing, said first layer, before embossing, having an initial thickness of between 100 micrometers and 650 micrometers, and wherein after embossing, said second region is thicker than said first region by an extra thickness that fills at least part of said cavity, said extra thickness being with a range of 10% to 80% thicker than a thickness of said first region and said thickness of said first region being less than or equal to 20 micrometers thinner than said initial thickness of said first layer.

2. The method of claim 1, wherein said cavity is formed at least in part by an opening through a thickness of said patterned plate.

3. The method of claim 2, further comprising covering said opening with a covering plate when pressing said patterned plate against said first surface and removing both said patterned plate and said covering plate once said second region has been formed, wherein, as a result of having provided said covering plate, said patterned plate is arranged between said covering plate and said first layer.

4. The method of claim 1, wherein said cavity is a hollow in said patterned plate.

5. The method of claim 1, wherein said first layer comprises thermoplastic.

6. The method of claim 1, further comprising executing a hot-pressing cycle of said first layer and said patterned plate with a temperature in a range from 120° C. to 195° C., at a pressure in a range from 17 to 110 newtons per square centimeter, and for a duration of between 15 minutes and 45 minutes.

7. The method of claim 1, further comprising executing a cool-pressing cycle after having executed a hot-pressing cycle, wherein said cool-pressing cycle is executed at a temperature in a range from 15° C. to 25° C., a pressure in a range from 50 to 220 newtons per square centimeter, and for a duration of between 13 and 45 minutes.

8. The method of claim 1, wherein said first layer comprises a thermoplastic polymer having a glass-transition temperature between 50° C. and 190° C.

9. The method of claim 1, further comprising providing a second layer, laying said second layer over at least a part of said first region, and laminating said first layer and said second layer to form a multilayer structure, wherein said second layer is a compensation layer having a cut-out that passes through an entire thickness thereof, wherein said compensation layer compensates for said extra thickness, wherein, as a result of said compensation layer having compensated for said extra thickness, said compensation layer forms a flat surface over which a finishing layer can lay, and wherein said cut-out is aligned with said second region.

10. The method of claim 9, further comprising cutting out at least a portion of a security document from said multilayer structure.

11. The method of claim 9, further comprising causing a finishing layer to overlap at least a part of said second layer and said second region.

12. The method of claim 9, further comprising inserting a security element between said first layer and said second layer.

13. The method of claim 9, further comprising applying a security element on one of said first layer and said second layer.

14. The method of claim 9, further comprising inserting a structure between said first layer and said second layer, said structure being selected from the group consisting of a thread, a foil, a patch, a printing, a metallization, and a demetallization.

15. The method of claim 9, further comprising causing said multilayer structure to be a constituent of a security article selected from the group consisting a passport, a page of a passport, an identification card, a driver's license, a transportation card, an access card, a coin, a casino coin, a casino plaquette, a credit card, a payment card, a banknote, a voucher, and a secured label.

16. The method of claim 1, further comprising laminating two layers of non-opaque plastic material to form said first layer.

17. The method of claim 1, further comprising inserting an antenna between two layers of non-opaque plastic material and laminating said two layers to form said first layer.

18. The method of claim 1, wherein providing said first layer comprises injecting around an antenna.

19. The method of claim 1, further comprising inserting a chip between two layers of non-opaque plastic material and laminating said two layers to form said first layer, wherein said chip is configured for contactless communication.

20. The method of claim 1, wherein providing said first layer comprises injecting around a chip that is configured for contactless communication.

21. The method of claim 1, wherein said first layer comprises a substance selected from the group consisting of polycarbonate, poly(vinyl-chloride), polyethylene terephthalate, polyethylene terephthalate glycol modified, polyethylene terephthalate film, polylactic acid, polyethylene and polyestercarbonate.

22. The method of claim 1, wherein said first layer comprises a thermally reticulated polymer having a glass-transition temperature between 50° C. and 190° C.

23. The method of claim 1, wherein said cut-out in said card is aligned with said second region of said first layer, wherein material from said second region of said first layer flows into said cavity as a result of said patterned plate having been pressed against said first surface of said first layer, and wherein, as a result of said material from said second region of said first layer having flowed into said cavity.

24. The method of claim 1, wherein the cavity that is disposed to be aligned with said cut-out is aligned with said cut-out.

25. The method of claim 1, further comprising manufacturing said card, wherein manufacturing said card comprises using said first layer in said card.

26. A method comprising manufacturing a first layer for use in a card having a cut-out in a layer thereof, wherein manufacturing said first layer comprises covering an area of said first layer with a patterned plate, thereby forming a cavity that is disposed to be aligned with said cut-out in said layer of said card, embossing said first layer, wherein embossing said first layer comprises placing said patterned plate directly in contact with a first surface of said first layer and pressing said patterned plate against a first surface of said first layer so as to form a first region and a second region in said first layer, and, after having embossed said first layer, removing said patterned plate from said first surface, wherein said first layer is made of a non-opaque plastic material, and wherein said second region is thicker than said first region by an extra thickness that fills at least part of said cavity, said method further comprising causing said first layer to be a constituent of a multilayer structure, wherein causing comprises providing a second layer and a third layer, wherein said second layer is a compensation layer for compensating for said extra thickness, wherein said second layer comprises a cut-out that is cut through an entire thickness thereof, wherein said second layer is disposed over at least part of said first region, and wherein said second region and said cut-out are aligned, wherein said third layer is a compensation layer, wherein said second and third layers are on either side of said first layer, wherein said third layer comprises a cut-out that has been cut through an entire thickness of said third layer, and wherein said cut-out is aligned with said second region.

27. The method of claim 26, further comprising providing said multilayer structure with a chip for communication.

28. A method comprising manufacturing a nonopaque plastic layer for incorporation into a card having a cut-out in a layer thereof, wherein manufacturing said non-opaque plastic layer comprises providing said non-opaque plastic material layer, said non-opaque plastic material having an initial thickness that is between 100 micrometers and 650 micrometers, covering a surface of said non-opaque plastic material layer with a patterned plate, and embossing said non-opaque plastic material layer, wherein embossing said non-opaque plastic material layer comprises placing said patterned plate in direct contact with a surface of said non-opaque plastic material layer and pressing said patterned plate against said surface of said non-opaque plastic material layer against which said patterned plate is in direct contact so as to form, in said non-opaque plastic layer, a first region and a second region that is thicker than said first region by an extra thickness, said extra thickness being 10% to 80% thicker than the thickness of said first region, said first region having a thickness that is less than or equal to 20 micrometers thinner than said initial thickness of said non-opaque plastic material layer, said second region being aligned with a cavity that is disposed to be aligned with said cut-out, which is in said layer of said card, thereby enabling said second region to be inlaid into said cavity, said method further comprising, after having embossed said non-opaque plastic material layer, freeing said surface of said non-opaque plastic material layer, wherein freeing said surface comprises removing said patterned plate from being in direct contact with said first surface of said non-opaque plastic material layer.

29. A manufacture for incorporation into a card having a cut-out, said manufacture comprising a layer of embossed non-opaque plastic material that comprises a first region and a second region that is integrally formed with said first region and that is disposed to be inlaid into said cut-out, said second region having a thickness that exceeds a thickness of said first region by an extra thickness, said extra thickness being between 10% and 80% thicker than a thickness of said first region, said thickness of said first region being less than or equal to 20 micrometers thinner than an initial thickness of said layer, and forming a single and homogeneous layer over said thickness thereof, said layer of non-opaque plastic material having been embossed as a result of an area of a layer of non-opaque plastic material having been covered by a patterned plate placed in direct contact with a surface of said non-opaque plastic material so as to form a cavity that is disposed to align with said cut-out, said patterned plate having been pressed directly against said surface so as to form said first and second regions, in said layer of non-opaque plastic material, said patterned plate having been removed prior to incorporation of said layer of non-opaque plastic material into said card, said layer of non-opaque plastic material having an initial thickness that is between 100 micrometers and 650 micrometers, wherein said cut-out in said card aligns with said second region of said layer of non-opaque plastic material, wherein, as a result of having been directly pressed by said patterned plate, material from said second region of said layer of non-opaque plastic material flows into said cavity, and wherein, as a result of said material from said second region of said layer of non-opaque plastic material having flowed into said cavity, said second region of said layer of non-opaque plastic material has become thicker than said first region of said layer of non-opaque plastic material by an extra thickness, said extra thickness being between 10% and 80% thicker than a thickness of said first region, said thickness of said first region being less than or equal to 20 micrometers thinner than said initial thickness of said first layer.

* * * * *